(12) United States Patent
Zheng et al.

(10) Patent No.: US 11,599,727 B2
(45) Date of Patent: Mar. 7, 2023

(54) INTELLIGENT TEXT CLEANING METHOD AND APPARATUS, AND COMPUTER-READABLE STORAGE MEDIUM

(71) Applicant: PING AN TECHNOLOGY (SHENZHEN) CO., LTD., Guangdong (CN)

(72) Inventors: Ziou Zheng, Guangdong (CN); Wei Wang, Guangdong (CN)

(73) Assignee: PING AN TECHNOLOGY (SHENZHEN) CO., LTD., Shenzhen (CN)

(*) Notice: Subject to any disclaimer, the term of this patent is extended or adjusted under 35 U.S.C. 154(b) by 0 days.

(21) Appl. No.: 17/613,942

(22) PCT Filed: Aug. 23, 2019

(86) PCT No.: PCT/CN2019/102204
§ 371 (c)(1),
(2) Date: Nov. 23, 2021

(87) PCT Pub. No.: WO2021/000391
PCT Pub. Date: Jan. 7, 2021

(65) Prior Publication Data
US 2022/0318515 A1    Oct. 6, 2022

(30) Foreign Application Priority Data
Jul. 3, 2019  (CN) .......................... 201910601253.7

(51) Int. Cl.
*G06F 17/00* (2019.01)
*G06F 40/30* (2020.01)
(Continued)

(52) U.S. Cl.
CPC .............. *G06F 40/30* (2020.01); *G06F 16/35* (2019.01); *G06F 40/166* (2020.01); *G06F 40/279* (2020.01)

(58) Field of Classification Search
CPC ........ G06F 40/30; G06F 16/35; G06F 40/166; G06F 40/279; G06F 16/355; G06N 3/0445; G06N 3/0454
See application file for complete search history.

(56) References Cited

U.S. PATENT DOCUMENTS

| 2011/0093258 A1* | 4/2011 | Xu ......................... G06F 40/237 704/9 |
| 2018/0052876 A1* | 2/2018 | Liu ..................... G06F 16/3347 |

(Continued)

OTHER PUBLICATIONS

Schierle, Martin, Sascha Schulz, and Markus Ackermann. "From spelling correction to text cleaning—using context information." Data Analysis, Machine Learning and Applications: Proceedings of the 31st Annual Conference of the Gesellschaft für Klassifikation eV, Albert-Ludwigs-Universität Freiburg, 2007 (Year: 2007).*

(Continued)

*Primary Examiner* — Andrew T McIntosh

(57) ABSTRACT

An intelligent text cleaning method includes: acquiring a text set, and preprocessing the text set to obtain a word vector text set; subjecting the word vector text set to a full-text matrix numeralization to generate a principal word vector matrix and a text word vector matrix; inputting the principal word vector matrix to a BiLSTM model to generate an intermediate text vector; inputting the text word vector matrix to a convolution neural network model to generate a target text vector; and concatenating the intermediate text vector and the target text vector to obtain combined text vectors, inputting the combined text vectors to a pre-constructed semantic recognition classifier model, outputting an aggregated text vector, subjecting the aggre- (Continued)

gated text vector to reverse recovery using a word2vec reverse algorithm, and outputting a standard text. The present application realizes accurate text cleaning.

20 Claims, 3 Drawing Sheets

(51) Int. Cl.
*G06F 16/35* (2019.01)
*G06F 40/279* (2020.01)
*G06F 40/166* (2020.01)

(56) References Cited

U.S. PATENT DOCUMENTS

| | | | |
|---|---|---|---|
| 2018/0068652 A1* | 3/2018 | Yong | G10L 15/063 |
| 2018/0300400 A1* | 10/2018 | Paulus | G06F 40/58 |
| 2019/0130248 A1* | 5/2019 | Zhong | G06N 3/0454 |
| 2019/0362020 A1* | 11/2019 | Paulus | G06N 3/006 |

OTHER PUBLICATIONS

Fahad, SK Ahammad, and Abdulsamad Ebrahim Yahya. "Inflectional review of deep learning on natural language processing." 2018 international conference on smart computing and electronic enterprise (ICSCEE). IEEE, 2018 (Year: 2018).*

* cited by examiner ly, to an intelligent text
INTELLIGENT TEXT CLEANING METHOD AND APPARATUS, AND COMPUTER-READABLE STORAGE MEDIUM

CLAIM OF PRIORITY

The present application claims priority under the Paris Convention to a Chinese patent application No. CN 201910601253.7, filed on Jul. 3, 2019 and entitled "Intelligent Text Cleaning Method and Apparatus, and Computer-readable Storage Medium", which is incorporated herein by reference in its entirety.

TECHNICAL FIELD

The present application relates to the technical field of artificial intelligence, more particular cleaning method and apparatus, and computer-readable storage medium based on a hybrid network model to solve improper line breaks.

BACKGROUND

A document consisting of a combination of texts obtained from various sources (such as HTML extracted text, pdf extracted text, etc.) tends to have improper line breaks due to the conversion from one format to another after the texts are copied and pasted. These improper line breaks are independent of the semantics, unlike the line break that follows a natural paragraph, and may trouble the subsequent presentations or semantic analysis. It is customary practice to manually figure out the cause of the improper line breaks from a particular source, summarize the pattern, and then remove them. However, this practice can hardly be reproduced in another case, not flexible enough, with low cost-effectiveness and poor accuracy for manual labor.

SUMMARY

The present application provides an intelligent text cleaning method and apparatus, and computer-readable storage medium, with a major object to solve the improper line breaks in a combined text formed by copying and pasting texts in different formats, thereby presenting a standard text with complete semantics and clear paragraphs to a user.

To achieve the above object, the present application provides an intelligent text cleaning method, including:

acquiring a text set, and preprocessing the text set to obtain a word vector text set;

subjecting the word vector text set to a full-text matrix numeralization to generate a principal word vector matrix and a text word vector matrix;

inputting the principal word vector matrix to a BiLSTM model to generate an intermediate text vector;

inputting the text word vector matrix to a convolution neural network model to generate a target text vector;

concatenating the intermediate text vector and the target text vector to obtain combined text vectors, inputting the combined text vectors to a pre-constructed semantic recognition classifier model, outputting an aggregated text vector, subjecting the aggregated text vector to reverse recovery using a word2vec reverse algorithm, and outputting a standard text.

Furthermore, to achieve the above object, the present application also provides an intelligent text cleaning apparatus, including a memory and a processor, wherein the memory stores an intelligent text cleaning program capable of running on the processor and, when executed by the processor, implementing the steps of:

acquiring a text set, and preprocessing the text set to obtain a word vector text set;

subjecting the word vector text set to a full-text matrix numeralization to generate a principal word vector matrix and a text word vector matrix;

inputting the principal word vector matrix to a BiLSTM model to generate an intermediate text vector;

inputting the text word vector matrix to a convolution neural network model to generate a target text vector;

concatenating the intermediate text vector and the target text vector to obtain combined text vectors, inputting the combined text vectors to a pre-constructed semantic recognition classifier model, outputting an aggregated text vector, subjecting the aggregated text vector to reverse recovery using a word2vec reverse algorithm, and outputting a standard text.

Furthermore, to achieve the above object, the present application also provides a computer-readable storage medium having stored thereon an intelligent text cleaning program executable by one or more processors to perform the steps of the intelligent text cleaning method as described above.

According to the intelligent text cleaning method and apparatus, and computer-readable storage medium proposed in the present application, to clean a text, an acquired text set is analyzed and processed, and combined text vectors of the text is obtained in conjunction with a BiLSTM-CNN hybrid model, the combined text vectors is input to a pre-constructed semantic recognition classifier model, an aggregated text vector is output, and the aggregated text vector is restored to obtain a standard text.

BRIEF DESCRIPTION OF THE ACCOMPANYING DRAWINGS

The object, features and advantages of the present application will be further described with reference to the accompanying drawings in conjunction with the embodiments.

DETAILED DESCRIPTION OF ILLUSTRATED EMBODIMENTS

It should be understood that the particular embodiments described herein are illustrative only and are not restrictive.

Figure 1:
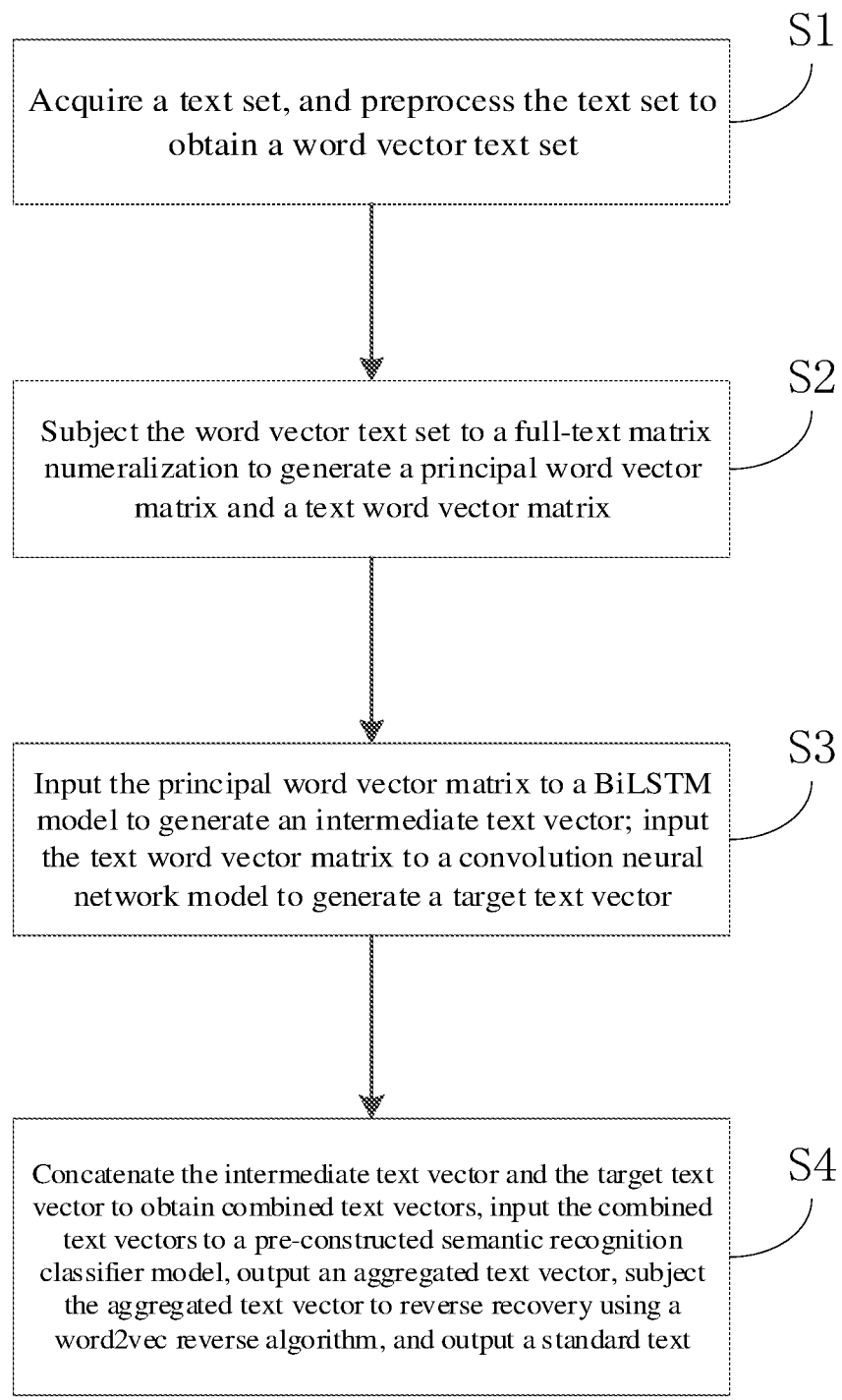
FIG. 1 is a schematic flow chart of an intelligent text cleaning method according to an embodiment of the present application.

The present application provides an intelligent text cleaning method. FIG. 1 shows a schematic flow chart of an intelligent text cleaning method according to an embodiment of the present application. The method may be performed by an apparatus, and the apparatus may be implemented with software and/or hardware.

In this embodiment. The intelligent text cleaning method includes the steps as follows.

In step S1, a text set is acquired, and the text set is processed to obtain a word vector text set.

In a preferred embodiment of the present application, the text set is obtained either 1) by searching for a keyword in online resources or 2) by downloading from the corpus of the Chinese Linguistic Center, Peking University.

The preprocessing described herein includes subjecting the text set to text segmentation by applying a split function to a string to obtain segments and using a word2vec model to convert a segment set into the word vector text set.

In particular, subjecting the text set to text segmentation by applying a split function to a string includes taking a single symbol as a divider, which can be "1", "*", "A" and the like, and dividing the text set into segments according to the divider to obtain a segment set.

Using a word2vec model to convert the segment set into the word vector text set includes quantizing the segment set with a one-hot code to obtain a vocabulary vector, inputting the vocabulary vector into the word2vec model, and subjecting the vocabulary vector to compression using a hidden layer in the word2vec model to form a low-dimensional vector, which is the word vector text.

With the one-hot code, every word in the world corresponds to an element in the vector. For example, if a word is present, then a position corresponding to the word is set as 1, and other positions are set as 0, therefore, all the words in the word set can be converted into vector representations, thereby forming the vocabulary vector.

In step S2, the word vector text set is subjected to a full-text matrix numeralization to generate a principal word vector matrix and a text word vector matrix.

In a preferred embodiment of the present application, the transformation from qualitative analysis to quantitative analysis of the word vector text set is enabled by subjecting the word vector text to the full-text matrix numeralization. Herein, the specific steps of the full-text matrix numeralization include: presetting that a number of words in the word vector text is represented by n, and a word vector dimension is represented by d, wherein the word vector dimension includes a part-of-speech feature, a character feature, a semantic position, emotional color and the like; converting the pre-set word vector text into a word vector value matrix X with an overall dimension of n*d through word vector stacking; interpreting the word vector value matrix X through a corpus interpreted by NLPCC, extracting a vector with a modification feature from the pre-set word vector text, and generating a matrix of the text word vector with a dimension of $n_1*d$; generating a principal word vector matrix with a dimension of $n_2*d$ consisting of the vectors with unmodified features in the pre-set text.

In step S3, the principal word vector matrix is input to a BiLSTM model to generate an intermediate text vector; the text word vector matrix is input to a convolution neural network model to generate a target text vector.

The BiLSTM model described in the present application includes two parts, namely, LSTM-target and LSTM-descri. In the present application, the $n_2*d$ principal word vector matrix is encoded by the LSTM-target encoder to obtain a forward implicit sequence as hr={w1(a), w2 (a), w3 (a). wn (a)}, and the $n_2*d$ principal word vector matrix is encoded by the LSTM-descri encoder to obtain a backward implicit sequence as h1={w1 (b), w2 (b), w3 (b). wn (b)}. Herein, hr and h1 are concatenated to obtain a principal word vector, and the principal word vectors are gathered to obtain the intermediate text vector. The calculation formula of the concatenating is as follows:

$$Wk'=wk(a)\oplus wk(b)$$

where wk' is a principal word vector, wk(a) is a forward k implicit sequence, and wk(b) is a backward k implicit sequence.

Furthermore, in a preferred embodiment of the present application, the text word vector matrix with a dimension of $n_1*d$ is input into the Convolutional Neural Networks (CNN), and the text word vector matrix is subjected to convolution according to a pre-set convolution kernel size, i.e., w*d, of the CNN to obtain an eigenvalue g, wherein the eigenvalue g is calculated as follows:

$$g=f(\omega \times x_{i:i+m-1}+b)$$

where $f$ represents the activation function, w represents a size of a sliding window of the convolution calculation, b represents a bias term, $x_{i:i+m-1}$ represents a local feature extracted in the range from row i to row i+m−1 in x.

Furthermore, in the present application, the eigenvalues are gathered to obtain a convolution eigenmatrix $S=[g_1, g_2, \ldots g_i, g_n]$, wherein the $g_i$ represents a feature extracted by a convolution kernel for a specific position.

Furthermore, in the present application, the convolution eigenmatrix S and the intermediate text vector C are mapped to the same dimensional space to obtain a cosine similarity $e_i$ between the convolution eigenmatrix S and the intermediate text vector C; an attention weight $a_i$ of the cosine similarity $e_i$ is calculated through orthogonal processing, and the attention weights $a_i$ are gathered to obtain an attention weight matrix; an eigenvalue in the convolution eigenmatrix S and a corresponding attention weight in the attention weight matrix are weighted to obtain a feature point in the target text vector, and the feature points in the target text vector are gathered to obtain a target text vector. For example, the $g_i$ is weighted with the $a_i$ to obtain a target text vector feature point $r_i$, and a plurality of $r_i$ are gathered to obtain the target text vector R as indicated by the following formula: $R=\Sigma a_i \cdot g_i$.

In step S4, the intermediate text vector and the target text vector are concatenated to obtain combined text vectors, the combined text vectors is input to a pre-constructed semantic recognition classifier model, an aggregated text vector is output through Softmax of the semantic recognition classifier model, the aggregated text vector is subjected to reverse recovery using a word2vec reverse algorithm, and a standard text is output.

In a preferred embodiment of the present application, the concatenation includes connecting the target text vector and the intermediate text vector end to end to generate the combined text vectors. Furthermore, the semantic recognition classifier model includes a classifier model where the combined text vectors is input, and the combined text vectors is aggregated by the classifier model to obtain an aggregated text vector. The aggregation includes picking out vectors with similar dimensional attributes and good semantic consistency out of the combined text vectors, connecting these vectors with punctuation symbols after screening out the other vectors in the combined text vectors to obtain the aggregated text vector, and outputting the aggregated text vector through Softmax of the classifier model. Furthermore, in the present application, the aggregated text vector is subjected to the reverse recovery through a word2vec reverse algorithm module to output the standard text, wherein the word2vec reverse algorithm module can restore a numerical text vector matrix into corresponding text data.

Figure 2:
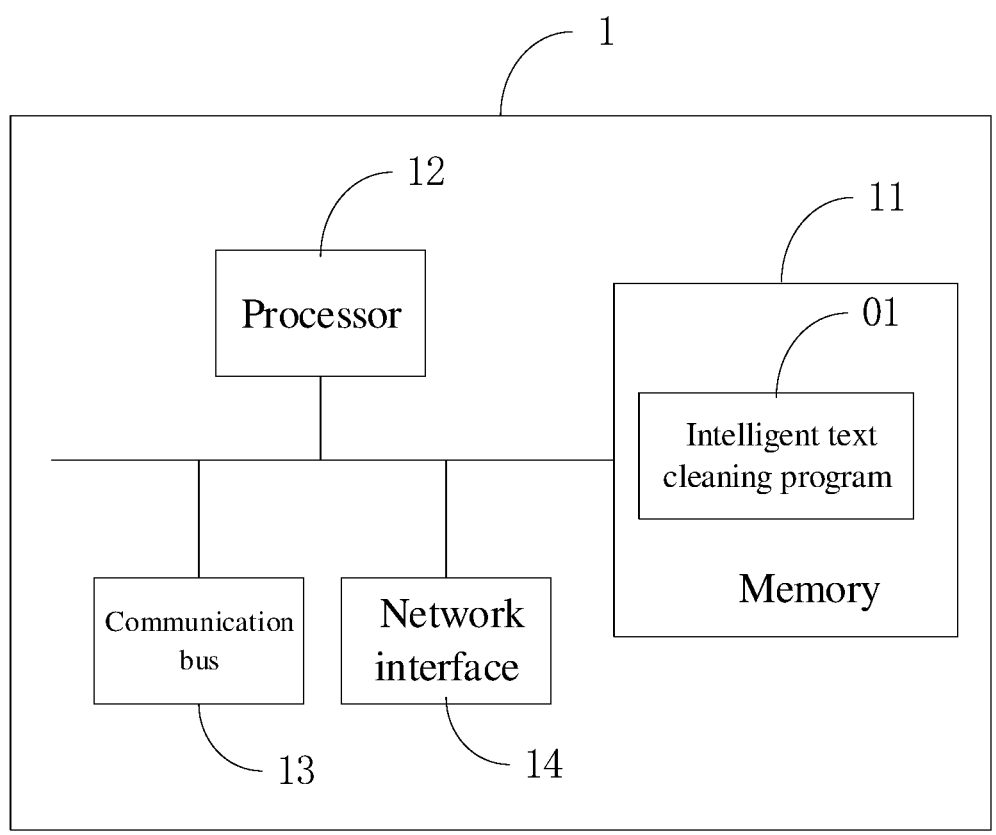
FIG. 2 is a schematic diagram showing an internal structure of an intelligent text cleaning apparatus according to an embodiment of the present application.

The present application also provides an intelligent text cleaning apparatus. FIG. 2 is a schematic diagram showing an internal structure of an intelligent text cleaning apparatus according to an embodiment of the present application.

In this embodiment, the intelligent text cleaning apparatus 1 may be a PC (Personal Computer), a terminal device such as a smart phone, a tablet computer and a portable computer, or a server. The intelligent text cleaning apparatus 1 includes at least a memory 11, a processor 12, a communication bus 13, and a network interface 14.

Herein, the memory 11 includes at least one type of readable storage medium including a flash memory, a hard disk, a multimedia card, a card-type memory (e.g., SD or DX memory, etc.), a magnetic memory, a magnetic disk, an optical disk, etc. The memory 11 may in some embodiments be an internal storage unit of the intelligent text cleaning apparatus 1, such as a hard disk of the intelligent text cleaning apparatus 1. The memory 11 may also be an external storage device of the intelligent text cleaning apparatus 1 in other embodiments, such as a plug-in hard disk, a smart media card (SMC), a secure digital (SD) card, or a Flash Card provided for the intelligent text cleaning apparatus 1. Furthermore, the memory 11 may include both an internal storage unit and an external storage device of the intelligent text cleaning apparatus 1. The memory 11 may be used not only to store application software installed in the intelligent text cleaning apparatus 1 and various types of data, such as codes of the intelligent text cleaning program 01, but also to temporarily store data that have been output or will be output.

The processor 12 may in some embodiments be a central processing unit (CPU), a controller, a microcontroller, a microprocessor or other data processing chip for running program code or processing data stored in the memory 11, for example, executing an intelligent text cleaning program 01 or the like.

The communication bus 13 is used to enable connection and communication among these components.

The network interface 14 may optionally include a standard wired interface, a wireless interface (e.g., a WI-FI interface), typically used for establishing communicative connections between the apparatus 1 and another electronic device.

Optionally, the apparatus 1 may further include a user interface, which may include a display and an input unit such as a keyboard, and the user interface may include optionally a standard wired interface and a wireless interface. Alternatively, in some embodiments, the display may be an LED display, a liquid crystal display, a touch-sensitive liquid crystal display, an OLED (Organic Light-Emitting Diode) touchpad, or the like. Where appropriate, the display may also be referred to as a display screen or a display unit for displaying information processed in the intelligent text cleaning apparatus 1 and for displaying a visual user interface.

While FIG. 2 only shows an intelligent text cleaning apparatus 1 with components 11 to 14 and an intelligent text cleaning program 01, it will be understood by those skilled in the art that the structure shown in FIG. 2 does not limit the intelligent text cleaning apparatus 1, and fewer or more components than shown, or some components in combination, or a different arrangement of components may be included.

In the embodiment of the apparatus 1 shown in FIG. 2, an intelligent text cleaning program 01 is stored in the memory 11; the intelligent text cleaning program 01 stored in the memory 11 performs the following steps when executed by the processor 12.

Step S1, a text set is acquired, and the text set is processed to obtain a word vector text set.

In a preferred embodiment of the present application, the text set is obtained either 1) by searching for a keyword in online resources or 2) by downloading from the corpus of the Chinese Linguistic Center, Peking University.

The preprocessing described herein includes subjecting the text set to text segmentation by applying a split function to a string to obtain segments and using a word2vec model to convert a segment set into the word vector text set.

In particular, subjecting the text set to text segmentation by applying a split function to a string includes taking a single symbol as a divider, which can be "|", "*", "A" and the like, and dividing the text set into segments according to the divider to obtain a segment set.

Using a word2vec model to convert the segment set into the word vector text set includes quantizing the segment set with a one-hot code to obtain a vocabulary vector, inputting the vocabulary vector into the word2vec model, and subjecting the vocabulary vector to compression using a hidden layer in the word2vec model to form a low-dimensional vector, which is the word vector text.

With the one-hot code, every word in the world corresponds to an element in the vector. For example, if a word is present, then a position corresponding to the word is set as 1, and other positions are set as 0, therefore, all the words in the word set can be converted into vector representations, thereby forming the vocabulary vector.

Step S2, the word vector text set is subjected to a full-text matrix numeralization to generate a principal word vector matrix and a text word vector matrix.

In a preferred embodiment of the present application, the transformation from qualitative analysis to quantitative analysis of the word vector text set is enabled by subjecting the word vector text to the full-text matrix numeralization. Herein, the specific steps of the full-text matrix numeralization include: presetting that a number of words in the word vector text is represented by n, and a word vector dimension is represented by d, wherein the word vector dimension includes part-of-speech feature, character feature, semantic position, emotional color and the like; converting the pre-set word vector text into a word vector value matrix X with an overall dimension of n*d through word vector stacking; interpreting the word vector value matrix X through a corpus interpreted by NLPCC, extracting a vector with a modification feature from the pre-set word vector text, and generating a matrix of the text word vector with a dimension of $n_1*d$; generating a principal word vector matrix with a dimension of $n_2*d$ consisting of the vectors with unmodified features in the pre-set text.

Step S3, the principal word vector matrix is input to a BiLSTM model to generate an intermediate text vector; the text word vector matrix is input to a convolution neural network model to generate a target text vector.

The BiLSTM model described in the present application includes two parts, namely, LSTM-target and LSTM-descri. In the present application, the $n_2*d$ principal word vector matrix is encoded by the LSTM-target encoder to obtain a forward implicit sequence as hr={w1 (a), w2 (a), w3 (a). wn (a)}, and the $n_2*d$ principal word vector matrix is encoded by the LSTM-descri encoder to obtain a backward implicit sequence as h1={w1 (b), w2 (b), w3 (b). wn (b)}. Herein, hr and h1 are concatenated to obtain a principal word vector, and the principal word vectors are gathered to obtain the intermediate text vector. The calculation formula of the concatenating is as follows:

$$Wk' = wk(a) \oplus wk(b)$$

where wk' is a principal word vector, wk(a) is a forward k implicit sequence, and wk(b) is a backward k implicit sequence.

Furthermore, in a preferred embodiment of the present application, the text word vector matrix with a dimension of $n_1*d$ is input into the Convolutional Neural Networks (CNN), and the text word vector matrix is subjected to convolution according to a pre-set convolution kernel size, i.e., w*d, of the CNN to obtain an eigenvalue g, wherein the eigenvalue g is calculated as follows:

$$g=f(\omega \times x_{i:i+m-1}+b)$$

where $f$ represents the activation function, w represents a size of a sliding window of the convolution calculation, b represents a bias term, $x_{i:i+m-1}$ represents a local feature extracted in the range from row i to row i m−1 in x.

Furthermore, in the present application, the eigenvalues are gathered to obtain a convolution eigenmatrix $S=[g_1, g_2, \ldots g_i, g_n]$, wherein the $g_i$ represents a feature extracted by a convolution kernel for a specific position.

Furthermore, in the present application, the convolution eigenmatrix S and the intermediate text vector C are mapped to the same dimensional space to obtain a cosine similarity $e_i$ between the convolution eigenmatrix S and the intermediate text vector C; an attention weight $a_i$ of the cosine similarity $e_i$ is calculated through orthogonal processing, and the attention weights $a_i$ are gathered to obtain an attention weight matrix; an eigenvalue in the convolution eigenmatrix S and a corresponding attention weight in the attention weight matrix are weighted to obtain a feature point in the target text vector, and the feature points in the target text vector are gathered to obtain a target text vector. For example, the $g_i$ is weighted with the $a_i$ to obtain a target text vector feature point $r_i$, and a plurality of $r_i$ are gathered to obtain the target text vector R as indicated by the following formula: $R=\Sigma a_i \cdot g_i$.

Step S4, the intermediate text vector and the target text vector are concatenated to obtain combined text vectors, the combined text vectors is input to a pre-constructed semantic recognition classifier model, an aggregated text vector is output through Softmax of the semantic recognition classifier model, the aggregated text vector is subjected to reverse recovery using a word2vec reverse algorithm, and a standard text is output.

In a preferred embodiment of the present application, the concatenation includes connecting the target text vector and the intermediate text vector end to end to generate the combined text vectors. Furthermore, the semantic recognition classifier model includes a classifier model where the combined text vectors is input, and the combined text vectors is aggregated by the classifier model to obtain an aggregated text vector. The aggregation includes picking out vectors with similar dimensional attributes and good semantic consistency out of the combined text vectors, connecting these vectors with punctuation symbols after screening out the other vectors in the combined text vectors to obtain the aggregated text vector, and outputting the aggregated text vector through Softmax of the classifier model. Furthermore, in the present application, the aggregated text vector is subjected to the reverse recovery through a word2vec reverse algorithm module to output the standard text, wherein the word2vec reverse algorithm module can restore a numerical text vector matrix into corresponding text data.

Alternatively, in other embodiments, the intelligent text cleaning program may be divided into one or more modules stored in the memory 11 and executed by one or more processors (the processor 12 in this embodiment) to implement the present application, where the module herein refers to a series of computer program instruction segments capable of performing a particular function to describe the execution process of the intelligent text cleaning program in the intelligent text cleaning apparatus.

Figure 3:
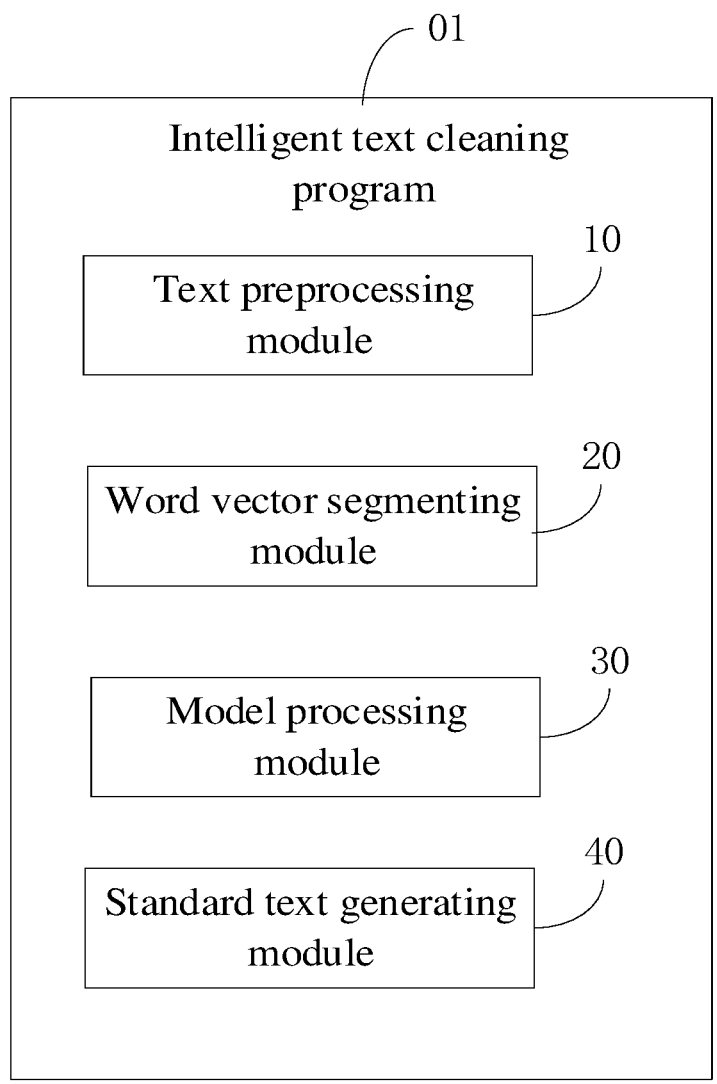
FIG. 3 is a block diagram of an intelligent text cleaning program in the intelligent text cleaning apparatus according to an embodiment of the present application.

For example, referring to FIG. 3, where a diagram of program modules of an intelligent text cleaning program in an embodiment of the intelligent text cleaning apparatus of the present application is shown. In this embodiment, the intelligent text cleaning program can be divided into a text preprocessing module 10, a word vector segmenting module 20, a model processing module 30 and a standard text generating module 40. As an example, the text preprocessing module 10 is configured for: acquiring a text set, and preprocessing the text set to obtain a word vector text set;

the word vector segmenting module 20 is configured for: subjecting the word vector text set to a full-text matrix numeralization to generate a principal word vector matrix and a text word vector matrix;

the model processing module 30 is configured for: inputting the principal word vector matrix to a BiLSTM model to generate an intermediate text vector; inputting the text word vector matrix to a convolution neural network model to generate a target text vector; and the standard text generating module 40 is configured for: concatenating the intermediate text vector and the target text vector to obtain combined text vectors, inputting the combined text vectors to a pre-constructed semantic recognition classifier model, outputting an aggregated text vector, subjecting the aggregated text vector to reverse recovery using a word2vec reverse algorithm, and outputting a standard text.

The program modules such as the text preprocessing module 10, the word vector segmenting module 20, the model processing module 30, and the standard text generating module 40 are executed to achieve substantially the same functions or steps as the above-mentioned embodiments, and will not be repeated herein.

In addition, the embodiment of the present application also provides a computer-readable storage medium having stored thereon an intelligent text cleaning program executable by one or more processors to:

acquire a text set, and preprocess the text set to obtain a word vector text set;

subject the word vector text set to a full-text matrix numeralization to generate a principal word vector matrix and a text word vector matrix;

input the principal word vector matrix to a BiLSTM model to generate an intermediate text vector;

input the text word vector matrix to a convolution neural network model to generate a target text vector; and concatenate the intermediate text vector and the target text vector to obtain combined text vectors, input the combined text vectors to a pre-constructed semantic recognition classifier model, output an aggregated text vector, subject the aggregated text vector to reverse recovery using a word2vec reverse algorithm, and output a standard text.

Embodiments of the computer-readable storage medium of the present application are substantially the same as the embodiments of the above-mentioned intelligent text cleaning apparatus and method, and will not be repeated here.

It should be noted that the above-mentioned serial numbers of the embodiments of the present application are merely for the purpose of description and do not represent the advantages and disadvantages of the embodiments. Also herein, the terms "include", "comprise", or any other variation thereof, are intended to cover a non-exclusive inclusion, such that a process, apparatus, article, or method that includes a list of elements does not include only those elements but may include other elements not expressly listed or inherent to such process, apparatus, article, or method. An element proceeded by "including one . . . " does not, without more constraints, preclude the existence of additional identical elements in the process, apparatus, article, or method that includes the element.

From the description of the embodiments given above, it will be clear to a person skilled in the art that the method of the embodiments described above can be implemented by means of software plus a necessary general hardware platform, but of course also by means of hardware, the former in many cases being a better embodiment. Based on such an understanding, the technical solution of the present application, either substantial or in a contribution to the prior art, can be embodied in the form of a software product, wherein the computer software product is stored in a storage medium, such as a ROM/RAM, a magnetic diskette, and an optical disk, as stated above, and includes a plurality of instructions for enabling a terminal device, which can be a mobile phone, a computer, a server, or a network device, to execute the method according to various embodiments of the present application.

The above-mentioned embodiments are merely preferred embodiments of the present application, and do not limit the scope of the present application. Any equivalent structural or process changes made based on the disclosure of the description and the drawings of the present application, or direct or indirect use thereof in other relevant technical fields are likewise included in the scope of the present application.

What is claimed is:

1. An intelligent text cleaning method, comprising:
   acquiring a text set, and preprocessing the text set to obtain a word vector text set;
   subjecting the word vector text set to a full-text matrix numeralization to generate a principal word vector matrix and a text word vector matrix;
   inputting the principal word vector matrix to a BiLSTM model to generate an intermediate text vector;
   inputting the text word vector matrix to a convolution neural network model to generate a target text vector;
   concatenating the intermediate text vector and the target text vector to obtain combined text vectors, inputting the combined text vectors to a pre-constructed semantic recognition classifier model, outputting an aggregated text vector, subjecting the aggregated text vector to reverse recovery using a word2vec reverse algorithm, and outputting a standard text.

2. The intelligent text cleaning method according to claim 1, wherein preprocessing the text set to obtain a word vector text set comprises:
   subjecting the text set to text segmentation by applying a split function to a string to obtain segments, and
   using a word2vec model to convert a segment set into the word vector text set.

3. The intelligent text cleaning method according to claim 2, wherein using a word2vec model to convert a segment set into the word vector text set comprises:
   quantizing the segment set with a one-hot code to obtain a vocabulary vector, inputting the vocabulary vector into the word2vec model, and subjecting the vocabulary vector to compression using a hidden layer in the word2vec model to form a low-dimensional vector, which is the word vector text.

4. The intelligent text cleaning method according to claim 1, wherein inputting the principal word vector matrix to a BiLSTM model to generate an intermediate text vector comprises:
   encoding, by a LSTM-target encoder in the BiLSTM model, the principal word vector matrix to obtain a forward implicit sequence;
   encoding, by a LSTM-descri encoder in the BiLSTM model, the principal word vector matrix to obtain a backward implicit sequence; and
   concatenating the forward implicit sequence and the backward implicit sequence to obtain a principal word vector, and gathering the principal word vectors to obtain the intermediate text vector.

5. The intelligent text cleaning method according to claim 1, wherein inputting the text word vector matrix to a convolution neural network model to generate a target text vector comprises:
   subjecting the text word vector matrix to convolution according to a pre-set convolution kernel size of the convolution neural network to obtain an eigenvalue;
   gathering the eigenvalues to obtain a convolution eigenmatrix, mapping the convolution eigenmatrix and the intermediate text vector to a same dimensional space to obtain a cosine similarity between the convolution eigenmatrix and the intermediate text vector;
   calculating an attention weight of the cosine similarity through orthogonal processing, and gathering the attention weights to obtain an attention weight matrix; and
   putting a weight to an eigenvalue in the convolution eigenmatrix and a corresponding attention weight in the attention weight matrix to obtain a feature point in the target text vector, and gathering the feature points in the target text vector to obtain a target text vector.

6. The intelligent text cleaning method according to claim 2, wherein inputting the text word vector matrix to a convolution neural network model to generate a target text vector comprises:
   subjecting the text word vector matrix to convolution according to a pre-set convolution kernel size of the convolution neural network to obtain an eigenvalue;
   gathering the eigenvalues to obtain a convolution eigenmatrix, mapping the convolution eigenmatrix and the intermediate text vector to a same dimensional space to obtain a cosine similarity between the convolution eigenmatrix and the intermediate text vector;
   calculating an attention weight of the cosine similarity through orthogonal processing, and gathering the attention weights to obtain an attention weight matrix; and
   putting a weight to an eigenvalue in the convolution eigenmatrix and a corresponding attention weight in the attention weight matrix to obtain a feature point in the target text vector, and gathering the feature points in the target text vector to obtain a target text vector.

7. The intelligent text cleaning method according to claim 3, wherein inputting the text word vector matrix to a convolution neural network model to generate a target text vector comprises:
   subjecting the text word vector matrix to convolution according to a pre-set convolution kernel size of the convolution neural network to obtain an eigenvalue;
   gathering the eigenvalues to obtain a convolution eigenmatrix, mapping the convolution eigenmatrix and the intermediate text vector to a same dimensional space to obtain a cosine similarity between the convolution eigenmatrix and the intermediate text vector;

calculating an attention weight of the cosine similarity through orthogonal processing, and gathering the attention weights to obtain an attention weight matrix; and putting a weight to an eigenvalue in the convolution eigenmatrix and a corresponding attention weight in the attention weight matrix to obtain a feature point in the target text vector, and gathering the feature points in the target text vector to obtain a target text vector.

8. The intelligent text cleaning method according to claim 4, wherein inputting the text word vector matrix to a convolution neural network model to generate a target text vector comprises:

subjecting the text word vector matrix to convolution according to a pre-set convolution kernel size of the convolution neural network to obtain an eigenvalue;

gathering the eigenvalues to obtain a convolution eigenmatrix, mapping the convolution eigenmatrix and the intermediate text vector to a same dimensional space to obtain a cosine similarity between the convolution eigenmatrix and the intermediate text vector;

calculating an attention weight of the cosine similarity through orthogonal processing, and gathering the attention weights to obtain an attention weight matrix; and putting a weight to an eigenvalue in the convolution eigenmatrix and a corresponding attention weight in the attention weight matrix to obtain a feature point in the target text vector, and gathering the feature points in the target text vector to obtain a target text vector.

9. An intelligent text cleaning apparatus, comprising a memory and a processor, wherein the memory stores an intelligent text cleaning program executable on the processor to perform the steps of:

acquiring a text set, and preprocessing the text set to obtain a word vector text set;

subjecting the word vector text set to a full-text matrix numeralization to generate a principal word vector matrix and a text word vector matrix;

inputting the principal word vector matrix to a BiLSTM model to generate an intermediate text vector;

inputting the text word vector matrix to a convolution neural network model to generate a target text vector;

concatenating the intermediate text vector and the target text vector to obtain combined text vectors, inputting the combined text vectors to a pre-constructed semantic recognition classifier model, outputting an aggregated text vector, subjecting the aggregated text vector to reverse recovery using a word2vec reverse algorithm, and outputting a standard text.

10. The intelligent text cleaning apparatus according to claim 9, wherein preprocessing the text set to obtain a word vector text set comprises:

subjecting the text set to text segmentation by applying a split function to a string to obtain segments, and using a word2vec model to convert a segment set into the word vector text set.

11. The intelligent text cleaning apparatus according to claim 10, wherein using a word2vec model to convert a segment set into the word vector text set comprises:

quantizing the segment set with a one-hot code to obtain a vocabulary vector, inputting the vocabulary vector into the word2vec model, and subjecting the vocabulary vector to compression using a hidden layer in the word2vec model to form a low-dimensional vector, which is the word vector text.

12. The intelligent text cleaning apparatus according to claim 9, wherein inputting the principal word vector matrix to a BiLSTM model to generate an intermediate text vector comprises:

encoding, by a LSTM-target encoder in the BiLSTM model, the principal word vector matrix to obtain a forward implicit sequence;

encoding, by a LSTM-descri encoder in the BiLSTM model, the principal word vector matrix to obtain a backward implicit sequence; and concatenating the forward implicit sequence and the backward implicit sequence to obtain a principal word vector, and gathering the principal word vectors to obtain the intermediate text vector.

13. The intelligent text cleaning apparatus according to claim 9, wherein inputting the text word vector matrix to a convolution neural network model to generate a target text vector comprises:

subjecting the text word vector matrix to convolution according to a pre-set convolution kernel size of the convolution neural network to obtain an eigenvalue;

gathering the eigenvalues to obtain a convolution eigenmatrix, mapping the convolution eigenmatrix and the intermediate text vector to a same dimensional space to obtain a cosine similarity between the convolution eigenmatrix and the intermediate text vector;

calculating an attention weight of the cosine similarity through orthogonal processing, and gathering the attention weights to obtain an attention weight matrix; and putting a weight to an eigenvalue in the convolution eigenmatrix and a corresponding attention weight in the attention weight matrix to obtain a feature point in the target text vector, and gathering the feature points in the target text vector to obtain a target text vector.

14. The intelligent text cleaning apparatus according to claim 10, wherein inputting the text word vector matrix to a convolution neural network model to generate a target text vector comprises:

subjecting the text word vector matrix to convolution according to a pre-set convolution kernel size of the convolution neural network to obtain an eigenvalue;

gathering the eigenvalues to obtain a convolution eigenmatrix, mapping the convolution eigenmatrix and the intermediate text vector to a same dimensional space to obtain a cosine similarity between the convolution eigenmatrix and the intermediate text vector;

calculating an attention weight of the cosine similarity through orthogonal processing, and gathering the attention weights to obtain an attention weight matrix; and putting a weight to an eigenvalue in the convolution eigenmatrix and a corresponding attention weight in the attention weight matrix to obtain a feature point in the target text vector, and gathering the feature points in the target text vector to obtain a target text vector.

15. The intelligent text cleaning apparatus according to claim 11, wherein inputting the text word vector matrix to a convolution neural network model to generate a target text vector comprises:

subjecting the text word vector matrix to convolution according to a pre-set convolution kernel size of the convolution neural network to obtain an eigenvalue;

gathering the eigenvalues to obtain a convolution eigenmatrix, mapping the convolution eigenmatrix and the intermediate text vector to a same dimensional space to obtain a cosine similarity between the convolution eigenmatrix and the intermediate text vector;

calculating an attention weight of the cosine similarity through orthogonal processing, and gathering the attention weights to obtain an attention weight matrix; and putting a weight to an eigenvalue in the convolution eigenmatrix and a corresponding attention weight in the attention weight matrix to obtain a feature point in the target text vector, and gathering the feature points in the target text vector to obtain a target text vector.

16. The intelligent text cleaning apparatus according to claim 12, wherein inputting the text word vector matrix to a convolution neural network model to generate a target text vector comprises:

subjecting the text word vector matrix to convolution according to a pre-set convolution kernel size of the convolution neural network to obtain an eigenvalue;

gathering the eigenvalues to obtain a convolution eigenmatrix, mapping the convolution eigenmatrix and the intermediate text vector to a same dimensional space to obtain a cosine similarity between the convolution eigenmatrix and the intermediate text vector;

calculating an attention weight of the cosine similarity through orthogonal processing, and gathering the attention weights to obtain an attention weight matrix; and putting a weight to an eigenvalue in the convolution eigenmatrix and a corresponding attention weight in the attention weight matrix to obtain a feature point in the target text vector, and gathering the feature points in the target text vector to obtain a target text vector.

17. A non-transitory computer-readable storage medium having an intelligent text cleaning program stored thereon, the intelligent text cleaning program being executable by one or more processors to perform the steps of:

acquiring a text set, and preprocessing the text set to obtain a word vector text set;

subjecting the word vector text set to a full-text matrix numeralization to generate a principal word vector matrix and a text word vector matrix;

inputting the principal word vector matrix to a BiLSTM model to generate an intermediate text vector;

inputting the text word vector matrix to a convolution neural network model to generate a target text vector;

concatenating the intermediate text vector and the target text vector to obtain combined text vectors, inputting the combined text vectors to a pre-constructed semantic recognition classifier model, outputting an aggregated text vector, subjecting the aggregated text vector to reverse recovery using a word2vec reverse algorithm, and outputting a standard text.

18. The non-transitory computer-readable storage medium according to claim 17, wherein preprocessing the text set to obtain a word vector text set comprises:

subjecting the text set to text segmentation by applying a split function to a string to obtain segments, and using a word2vec model to convert a segment set into the word vector text set.

19. The non-transitory computer-readable storage medium according to claim 18, wherein using a word2vec model to convert a segment set into the word vector text set comprises:

quantizing the segment set with a one-hot code to obtain a vocabulary vector, inputting the vocabulary vector into the word2vec model, and subjecting the vocabulary vector to compression using a hidden layer in the word2vec model to form a low-dimensional vector, which is the word vector text.

20. The non-transitory computer-readable storage medium according to claim 17, wherein inputting the principal word vector matrix to a BiLSTM model to generate an intermediate text vector comprises:

encoding, by a LSTM-target encoder in the BiLSTM model, the principal word vector matrix to obtain a forward implicit sequence;

encoding, by a LSTM-descri encoder in the BiLSTM model, the principal word vector matrix to obtain a backward implicit sequence; and concatenating the forward implicit sequence and the backward implicit sequence to obtain a principal word vector, and gathering the principal word vectors to obtain the intermediate text vector.

* * * * *